May 19, 1964    A. WUNSCH    3,133,767
CHAIN CONSTRUCTION
Filed July 20, 1962

INVENTOR
ADOLF WUNSCH
By:
McGlew and Toren
ATTORNEYS

United States Patent Office 3,133,767
Patented May 19, 1964

3,133,767
CHAIN CONSTRUCTION
Adolf Wunsch, Ettlingen, Baden, Germany, assignor to Eisen- und Drahtwerk Erlau AG., Aalen, Wurttemberg, Germany
Filed July 20, 1962, Ser. No. 211,300
Claims priority, application Germany July 25, 1961
6 Claims. (Cl. 305—56)

This invention relates in general to skid chain constructions and in particular to a new and useful skid chain construction particularly adaptable for use with vehicles having two wheels closely spaced together and including an improved construction to insure that the chain cannot be thrown off during operation of the vehicle.

While the invention is applicable to a vehicle employing a single wheel, it has particular application for use with vehicles which include closely spaced axles arranged so that two wheels with tires are arranged in closely spaced position, one behind the other. With vehicles of this type, there is a great tendency for the known chain constructions to be thrown off during the operation of the vehicle. To prevent this, it is usual to employ chains having gripping elements or members which are arranged transversely or longitudinally relative to the tire contact running surface. These chains are predominantly used in earth moving and transporting machines for excavation purposes. Without employing such chains, the vehicles tend to dig themselves into the soil, particularly in sandy soil and difficult terrain of varying soil consistency. Further, without chains, the vehicles tend to slip and do not get a satisfactory hold on the ground, particularly when the ground is wet and clay soils are encountered. While the application of chains of the usual construction improves the operation of the vehicle, experience has shown that chains, upon shifting of the weight of the vehicle, are thrown off, particularly in the instance where the vehicle includes axles which are pivotally mounted. When the chains are thrown off, it is extremely difficult, if not impossible, to reapply the chains, particularly when the terrain is muddy, so that the vehicle will become stuck in the soil and have to be towed away in most instances.

In accordance with the present invention, there is provided an improved chain construction which includes angular members or link elements with an arm or a leg portion which is arranged to engage under a running surface of the tire and another leg portion which is arranged to engage along the side of the tire. In a construction of this nature, the tire will always engage with its running surface on one of the legs of the angular element so that the other leg bears against the lateral wall of the tire and forms an unobjectionable guide for the chains. In this manner, any tilting, sliding or other movement of the chain inwardly or outwardly is rendered impossible. In addition, it is possible to maintain the track of the chain in an improved manner. The chain adheres much better to the tire because of the angular piece configuration even in the transition zone from the horizontal running surface to the substantially vertical surface of the lateral wall of the tire. The configuration permits bearing against the tire in an excellent manner. The construction is also applicable even when the tire is severely worn, since the profile at the transition area is maintained even on such worn tire.

According to a further feature of the invention, the running surface of the tire is gripped under by a corresponding leg element of the angular piece beyond the flanks of the tire and the transition between the running surface and the lateral surface of the tire. In this manner, the action of the angular piece or pieces is still further improved and the maintenance of the track by the chain is enhanced.

In one embodiment, the angular piece may be constructed as a grip element which extends beneath the tire to form a track, and special stirrup elements which otherwise would form a connection between the lateral elements of the chain would not be necessary. In this construction, two opposing angular pieces extend on opposite sides of the tire and are advantageously made of one piece. In accordance with a preferred embodiment of the invention, however, separate gripping members are used which comprise angular pieces arranged at each side of the gripping members. The angular pieces each have one leg disposed to be positioned under the tire running surface and another leg extending upwardly to grip the side of the tire. With a construction of this nature, it is preferable to use a gripping element pivotally connected to opposed angular members at each end. The gripping member may be, for example, a rubber plate or steel member. A particularly simple embodiment is one in which the angular pieces are constructed in a manner of a wire stirrup. With such a construction, the wire wedges itself into the profile of the tire whereby a stronger adhesion of the parts to the tire is obtained.

Accordingly, it is an object of the present invention to provide an improved anti-skid chain construction.

A further object of the invention is to provide a chain construction including chain elements which comprise angular members disposed at each side of the tire having one leg which extends under the running surface of the tire and one leg which extends upwardly along the side of the tire.

A further object of the invention is to provide a tire construction which includes a gripping element adapted to ride under the running surface of the tire and angular elements pivotally connected at each side of the gripping elements, including a leg portion which extends under the tire and a leg portion which extends along the side of the tire.

A further object of the invention is to provide a chain construction particularly for vehicles having closely spaced wheels, including angular elements having one leg portion which runs under the running surface of the tire and a leg portion which runs alongside of the tire arranged to insure that the chain is maintained in gripping relationship with the wheels and will not be thrown off.

A further object of the invention is to provide a chain construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
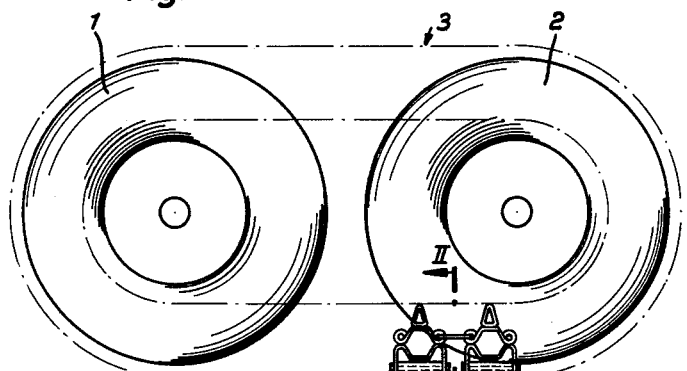
FIG. 1 is a somewhat schematic side elevation of two wheels of a vehicle with a chain construction therefor constructed in accordance with the invention.
Figure 3:
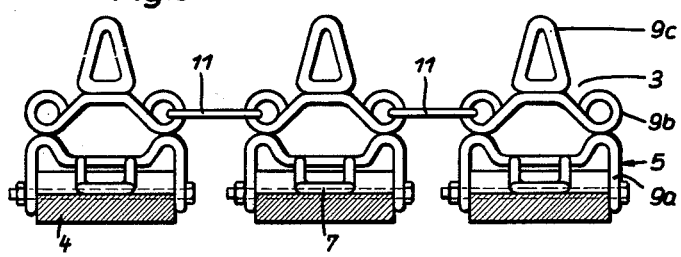
FIG. 3 is a section taken along the line 3—3 of FIG. 2.

Referring to the drawings in particular, the invention embodied in FIGS. 1 and 3 includes a chain generally designated 3 shown in association with a vehicle having two tires 1 and 2 arranged in closely spaced relationship, one behind the other.

Figure 2:
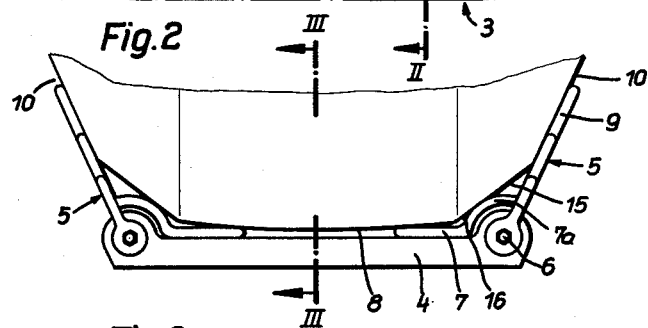
FIG. 2 is an enlarged fragmentary sectional view taken along the line 2—2 of FIG. 1.

In accordance with the invention, the chain 3 in the embodiments of FIGS. 1 to 3 comprises a plurality of stirrups or stirrup assemblies each including individual gripping members 4 which are arranged transverse to a tire running surface 8 and an angular member or element generally designated 5 at each side. The angular member or element generally designated 5 is pivotally connected at each side of the gripping members 4 by means of a pivot pin connection or bolt 6. The angular member 5 is constructed with a leg portion 7 which is adapted to grip under the tire running surface 8 and with a leg portion 9 which is rigidly connected or formed integrally with the leg portion 7 and is adapted to grip along a lateral surface 10. For the purpose of conforming to the sides of the tire, the leg portion 7 includes a curved portion 7a which is adapted to fit at the transition between the bottom surface 8 and the side surface 10 of the tire.

In the construction set forth, pressure is transmitted via the tire running surface 8 downwardly to the legs 7, 7 so that the legs 9, 9 which are part of the integral angular member 5 are pressed inwardly against the lateral surface 10 of the tire and an excellent guide for the chain is obtained. The downward pressure on the leg 7 causes rotation of the angular members 5 about their pivotal connection to the transverse gripping members 4 and have inward movement of leg portions 9. With this construction, the chain, even under very difficult ground conditions, cannot be thrown off the wheels 1 or 2.

In the embodiment illustrated in FIGS. 1 to 3, the angular pieces 5 are connected laterally with each other by means of chain elements 11, so that an endless chain 3 is obtained. The angular members 5 are advantageously bent from wire so that the production thereof is very inexpensive. Because the wire conforms to the surface of the tire, gripping action is increased. The curved portion 7a of the leg 7 grips at the transition area 16 beneath the tire and the leg portion 9 advantageously grips at the beginning of the transition 15 to the lateral portion 10. The leg 9 advantageously includes a lower link portion 9a, an intermediate link portion 9b, and an upper link portion 9c which are rigidly interconnected, such as by welding. The intermediate portion 9b includes eyelet formations in which the link elements 11 are looped.

Figure 4:
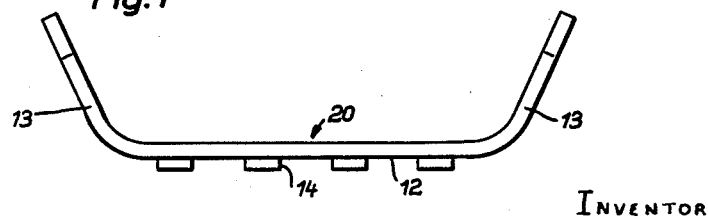
FIG. 4 is a section similar to FIG. 2 of another embodiment of the invention.

In the embodiment indicated in FIG. 4, a chain generally designated 20 is provided which includes a basic surface or gripping member 12 which forms a gripping surface as well as a portion of the angular elements, such as the upwardly extending angular legs 13 which are adapted to straddle the sides of the tires. The surface 12 is provided with downwardly extending projections 14 to increase the gripping action thereof.

While a specific embodiment of the invention has been illustrated and described to show the application of the inventive principles, it will be understood that this invention may be embodied otherwise without departing from such principles.

What is claimed is:

1. An anti-skid chain for a vehicle, particularly for one in which two wheels are arranged one behind the other in respect to a running direction and in which the wheels have a flat ground-engaging surface and lateral surfaces extending upwardly at an angle from the ground-engaging surface, comprising a plurality of chain link assemblies each comprising a substantially flat gripping element adapted to extend from side to side of the wheels beneath the ground-engaging surface and transverse to the running direction, a first angular member pivotally connected directly to one side of said gripping element and having a leg portion extending generally upwardly from said gripping element and adapted to overlie and engage a side of a tire and a second leg portion extending generally horizontally and substantially parallel to said gripping element and adapted to extend beneath the tire in engagement with the running surface thereof, and a second angular member pivotally connected directly to the opposite side of said gripping member and having a first leg portion extending generally upwardly from said gripping element and engaging the opposite side of the tire and a second leg portion extending generally horizontally and substantially parallel to said gripping element and beneath the tire and engaging the ground-engaging surface thereof.

2. An anti-skid chain for a vehicle according to claim 1, wherein said first and second angular members each include a curved portion adapted to underlie said tire at the transition between the bottom and the side portions thereof.

3. An anti-skid chain according to claim 1, wherein said angular members are constructed in the form of wire stirrups.

4. A chain construction, comprising a plurality of interconnected link assemblies, each assembly comprising a substantially flat gripping member adapted to be disposed horizontally and having openings at each end for receiving pivot bolts, and first and second angular members pivotally connected to each side of said gripping member, each of said angular members including a bottom leg portion adapted to be disposed horizontally and a side leg portion adapted to extend upwardly for engagement with the side of a wheel, said angular members having openings at the junction of said bottom and side leg portions for receiving pivot bolts, said pivot bolts extending through the openings of said angular members and corresponding openings of said gripping member for pivotally supporting said angular members directly on each end of said gripping member, and link elements interconnecting said assemblies at the location of said upwardly extending leg portions of said first and second angular members.

5. An anti-skid chain for at least two tires which are situated one behind the other in respect to a traveling direction, particularly for motor vehicles, said chain having stirrups of non-elastic material, characterized in that the stirrups comprise a gripping member which is arranged transversely to the traveling direction and further of two angular pieces, said angular pieces being arranged opposite each other and being directly pivotally secured at the gripping member, said angular pieces moreover being rockable about axes which extend in the traveling direction, said angular pieces including legs, one extending generally horizontally outwardly from the pivotal connection to said gripping member and at least partially gripping over the tire running surfaces, and the other extending generally upwardly from the pivotal connection to said gripping member and at least partially gripping the tire lateral surfaces.

6. An anti-skid chain according to claim 5, wherein said angular pieces are constructed as wire elements.

References Cited in the file of this patent

UNITED STATES PATENTS

| 1,540,067 | Grimord et al. | June 2, 1925 |
| 1,566,876 | Johnson | Dec. 22, 1925 |
| 1,808,416 | Kennedy | June 2, 1931 |
| 2,179,587 | Deardorff | Nov. 14, 1939 |

FOREIGN PATENTS

| 589,200 | Great Britain | June 13, 1947 |